United States Patent
Hu et al.

(10) Patent No.: US 8,237,081 B2
(45) Date of Patent: Aug. 7, 2012

(54) MANUFACTURING SYSTEM HAVING DELIVERY MEDIA AND GRIN LENS

(75) Inventors: Zhaoli Hu, Dunlap, IL (US); Marion B. Grant, Jr., Princeville, IL (US)

(73) Assignee: Caterpillar Inc., Peoria, IL (US)

( * ) Notice: Subject to any disclaimer, the term of this patent is extended or adjusted under 35 U.S.C. 154(b) by 1041 days.

(21) Appl. No.: 12/153,944

(22) Filed: May 28, 2008

(65) Prior Publication Data

US 2009/0294423 A1 Dec. 3, 2009

(51) Int. Cl.
*B23K 26/06* (2006.01)
*B23K 26/38* (2006.01)

(52) U.S. Cl. .............. 219/121.71; 219/121.61

(58) Field of Classification Search .............. 219/121.7, 219/121.71, 121.85, 121.67, 121.72
See application file for complete search history.

(56) References Cited

U.S. PATENT DOCUMENTS

| | | | |
|---|---|---|---|
| 4,302,654 A * | 11/1981 | Bennett et al. | 219/121.71 |
| 4,443,684 A | 4/1984 | Sakuragi et al. | |
| 4,676,586 A | 6/1987 | Jones et al. | |
| 4,681,396 A | 7/1987 | Jones | |
| 4,799,755 A | 1/1989 | Jones | |
| 5,053,033 A * | 10/1991 | Clarke | 606/3 |
| 5,093,548 A | 3/1992 | Schmidt-Hebbel | |
| 5,237,148 A | 8/1993 | Aoki et al. | |
| 5,645,354 A | 7/1997 | Heinzl et al. | |
| 5,852,692 A | 12/1998 | Nightingale et al. | |
| 6,070,813 A | 6/2000 | Durheim | |
| 6,355,907 B1 | 3/2002 | Kuehnle et al. | |
| 6,407,362 B1 | 6/2002 | Schmid et al. | |
| 6,476,350 B1 | 11/2002 | Grandjean et al. | |
| 6,642,477 B1 * | 11/2003 | Patel et al. | 219/121.71 |
| 6,888,097 B2 | 5/2005 | Batarseh | |
| 7,202,441 B2 | 4/2007 | Klügl et al. | |
| 2006/0000816 A1 | 1/2006 | Hogan | |
| 2006/0237406 A1 | 10/2006 | Schmidt-Sandte et al. | |
| 2008/0041768 A1 | 2/2008 | Rebinsky | |
| 2009/0294421 A1 | 12/2009 | Hu et al. | |

* cited by examiner

*Primary Examiner* — Samuel M Heinrich

(74) *Attorney, Agent, or Firm* — Finnegan, Henderson, Farabow, Garrett & Dunner LLP

(57) ABSTRACT

A manufacturing system is disclosed. The manufacturing system may have a laser source configured to generate a laser beam, and a delivery media operatively connected to the laser source. The manufacturing system may also have a gradient index lens located at a tip end of the delivery media to refract and focus the laser beam exiting the delivery media.

19 Claims, 3 Drawing Sheets

MANUFACTURING SYSTEM HAVING DELIVERY MEDIA AND GRIN LENS

TECHNICAL FIELD

The present disclosure relates to a laser manufacturing system and, more particularly, to a laser manufacturing system having a delivery media with a gradient index lens (a GRIN lens) attached at a tip end thereof.

BACKGROUND

A fuel injector can be used to inject high pressure fuel into a cylinder of a combustion engine. Specifically, a tip of the fuel injector has one or more small orifices disposed therein and, as the high pressure fuel is directed into the fuel injector, it passes to the cylinder by way of these orifices. To enhance operation of the combustion engine, the orifices are precisely formed to have a particular profile and opening diameters.

One way to produce high-precision orifices is through laser machining. Specifically, laser machining involves the use of a laser to melt, vaporize, and/or ablate micro-craters within the fuel injector in a controlled fashion. In some situations, laser machining of fuel injectors can benefit from the use of a delivery media. For example, in the fuel injector application, because of small clearances within the fuel injector, it can be difficult to access the tip area of the injector for machining from the inside. In these situations, the delivery media can be inserted into the fuel injector and used to deliver a laser beam from the laser into the injector tip for machining from the inside. When using a delivery media in a laser machining application, care should be taken to properly position, orient, and focus the laser beam exiting the tip end of the delivery media such that the resulting feature is positioned properly and has a desired profile.

One example of a system that uses a delivery fiber in conjunction with laser machining is disclosed in U.S. Pat. No. 6,888,097 (the '097 patent) issued to Batarseh on May 3, 2005. In particular, the '097 patent discloses an apparatus for perforation of well bore walls. The apparatus includes a flexible fiber optic cable having a laser input end and a laser output end. A laser source is operably connected to the laser input end, and a laser head is connected to the laser output end. The laser head includes control components for controlling a laser beam characteristic. These control components include a movable mirror that reflects the laser beam laterally outward from the laser head, and a lens that is adjustable to enable focusing of the laser beam in the axial direction of the fiber optic cable. Laser head control elements for controlling the motion and location of the laser head within the well bore are operably connected to the fiber optic cable along a length of the cable. With this configuration, the fiber optic cable can be lowered into an existing well bore, and a laser beam can be directed through the cable and reflected off of the mirror to drill holes along a length of the well bore walls.

Although the apparatus described in the '097 patent may enable laser machining in a difficult-to-access area, its use and accuracy may be limited. Specifically, because of the size and location of the laser head control elements, the configuration described in the '097 patent may be of little use in manufacturing components smaller than a well bore where tight clearances may be an issue. In addition, the use of the mirror to reflect the laser beam may result in poor machining location accuracy and reduced durability in high production applications. Further, the flexibility of the fiber optic cable may reduce repeatability of the machining process.

The present disclosure is directed to overcoming one or more of the shortcomings set forth above and/or other problems of the prior art.

SUMMARY

In one aspect, the present disclosure is directed to a manufacturing system. The manufacturing system may include a laser source configured to generate a laser beam, and a delivery media operatively connected to the laser source. The manufacturing system may also include a gradient index lens located at a tip end of the delivery media to refract and focus the laser beam exiting the delivery media.

In another aspect, the present disclosure is directed to a method of manufacturing a feature in a workpiece. The method may include generating a laser beam, and directing the laser beam through a reflective passageway. The method may also include refracting and focusing the laser beam as it exits the reflective passageway onto an internal surface of the workpiece to form an orifice through the workpiece.

DETAILED DESCRIPTION

Figure 1:
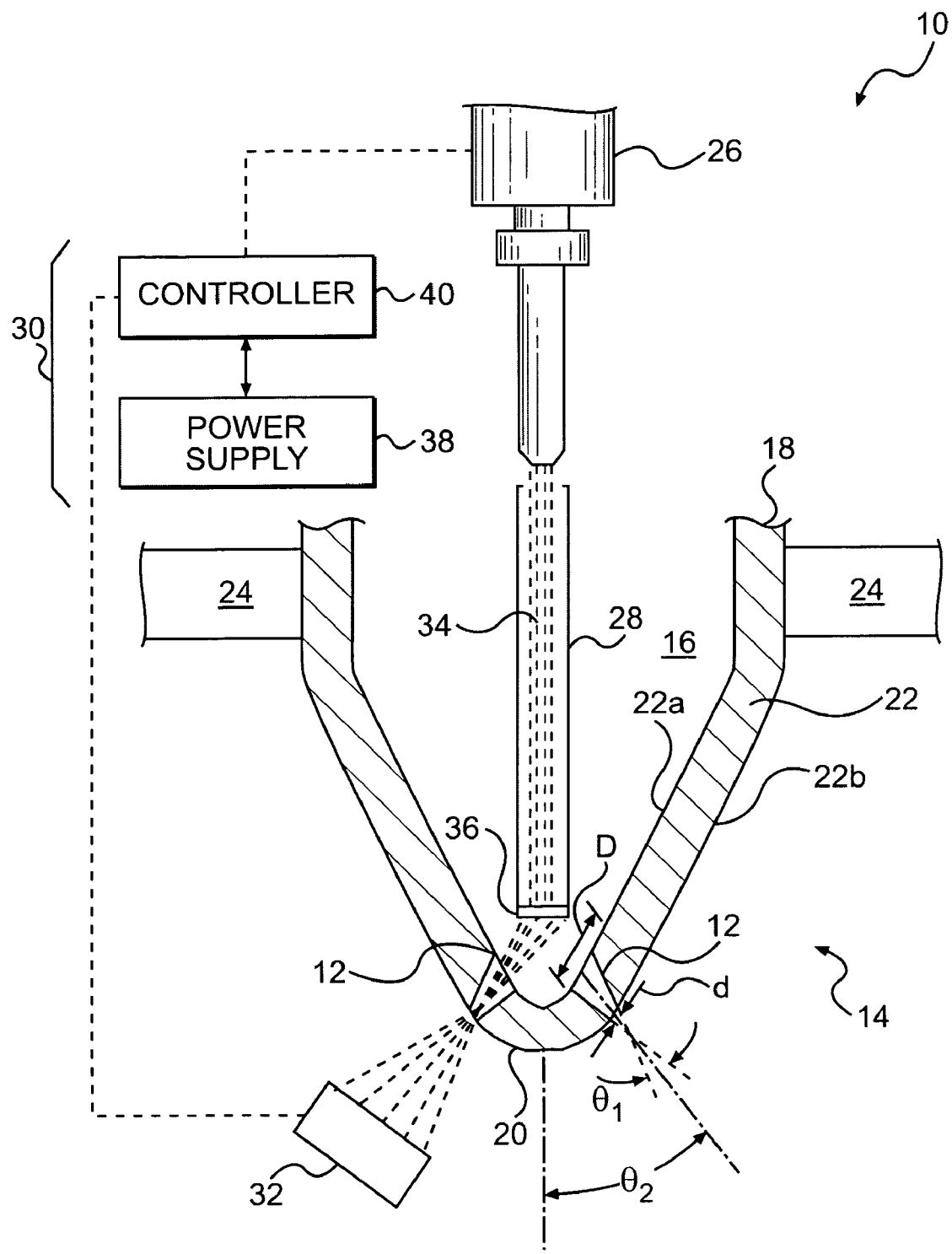
FIG. 1 is a diagrammatic illustration of an exemplary disclosed manufacturing system.

FIG. 1 illustrates a manufacturing system 10 used to create one or more features 12 within a workpiece 14. In one example, workpiece 14 may be a fuel injector nozzle, for example a high pressure fuel injector nozzle for use with a common rail fuel system (not shown). As a fuel injector nozzle, workpiece 14 may be generally hollow, having an internal axial bore 16 that extends from a base end 18 toward a tip end 20. One of features 12 may be, for example, an injection orifice passing through a side wall 22 of workpiece 14 at tip end 20. To improve a flow of fuel from bore 16 into a combustion chamber (not shown) of an associated combustion engine (not shown), each injection orifice may have a reverse taper profile. That is, each orifice may be generally circular in cross-section and have a diameter "D" at an internal surface 22a of wall 22 that is greater than a diameter "d" at an external surface 22b of wall 22 such that a cross-sectional flow area of the orifice decreases in a flow direction through feature 12. In one example, each of diameters "D" and "d" may be within the range of about 0.05-0.3 mm, with a taper angle $\theta_1$ in the range of about 0.1-10°. In addition, each orifice may be tilted relative to a central axis of bore 16 by a droop angle $\theta_2$ between about 10-60°. Manufacturing system 10 may include a mount 24 configured to receive workpiece 14, a laser source 26 configured to create features 12 within workpiece 14 by way of a delivery media 28, and a control module 30 that regulates operation of manufacturing system 10 in response to sensory feedback.

Mount 24 may be used to position workpiece 14 relative to delivery media 28 in anticipation of a machining process, and may maintain workpiece 14 substantially stationary relative to laser source 26 during the process. Mount 24 may employ any traditional method such as clamping with a vise, a collet, or other suitable device, so long as workpiece 14 is retained sufficiently immobile during manufacturing to obtain desirable machined tolerances. It is further appreciated that workpiece 14 may be retained in a manner that sufficiently reduces vibration and other disturbances. In one example, a linear and/or a rotary actuator (not shown) may be associated with mount 24 to move workpiece 14 into and out of a machining position relative to delivery media 28 in anticipation of or after machining of feature 12.

Laser source 26 may be configured to generate and direct one or more polarized laser beams through delivery media 28. Laser source 26 may include, for example, one or more of an Excimer laser, a Yb:tunstates laser, a $CO_2$ laser, a Nd:YAG laser, a DPSS laser, or any other type of laser known in the art. In one example, laser source 26 may be capable of generating an ultra-short pulse laser beam 34 having pulses between $10^{-12}$ and $10^{-18}$ seconds in duration, a repetition rate of about 1-20 kH, a wavelength of about 300-1000 nm, and a pulse energy of about 0.1-3 mJ.

Delivery media 28 may embody a light-transmitting passageway that is operatively coupled to laser source 26 and configured to direct laser beam(s) 34 and, in some instances a protective gas, from laser source 26 toward workpiece 14. It is contemplated that delivery media 28 may be a hollow core fiber having a core diameter of between about 10-150 μm and a durability sufficient to deliver high-energy laser pulses without significant deterioration or energy loss. Alternatively, delivery media 28 may embody a solid core fiber, for example, a glass optical fiber. In either configuration, it is contemplated that delivery media 28 may include one or more co-axial layers or sheaths of lining material, with the protective gas, for example, helium, argon, or nitrogen, directed between the layers and into workpiece 14 for shielding, media strengthening, and/or drill quality purposes, if desired.

Delivery media 28 may be at least partially disposed within bore 16 of workpiece 14 during machining of features 12 to direct laser beam 34 into the hollow portion of workpiece 14 (i.e., toward an internal annular surface of bore 16). Delivery media 28 may be substantially rigid and include optics 36 located at a tip end thereof that refract (i.e., bend) and focus laser beam 34 toward wall 22 in a manner that produces feature 12 having desired characteristics. In one example, a refraction angle of laser beam 34 induced by optics 36 may be about equal to the resulting droop angle of feature 12, while a focus angle of laser beam 34 induced by optics 36 may be about equal to the resulting taper angle of feature 12.

Optics 36 may be fixedly coupled to the tip end of delivery media 28 and include, among other things, a gradient index lens (a GRIN lens). A GRIN lens is a device with a radially-decreasing refractive index that can be used to focus, redirect, and/or align one or more laser beams 34 by way of refraction. The particular GRIN lens utilized to produce feature 12 may be dependent on an application of workpiece 14 and selected to provide or enhance a particular flow characteristic of fluid passing through workpiece 14. In one example, optics 36 may include a GRIN lens capable of refracting laser beam 34 by an angle of about 10-60°, with a focus angle of about 0.01-10°.

Figure 2:
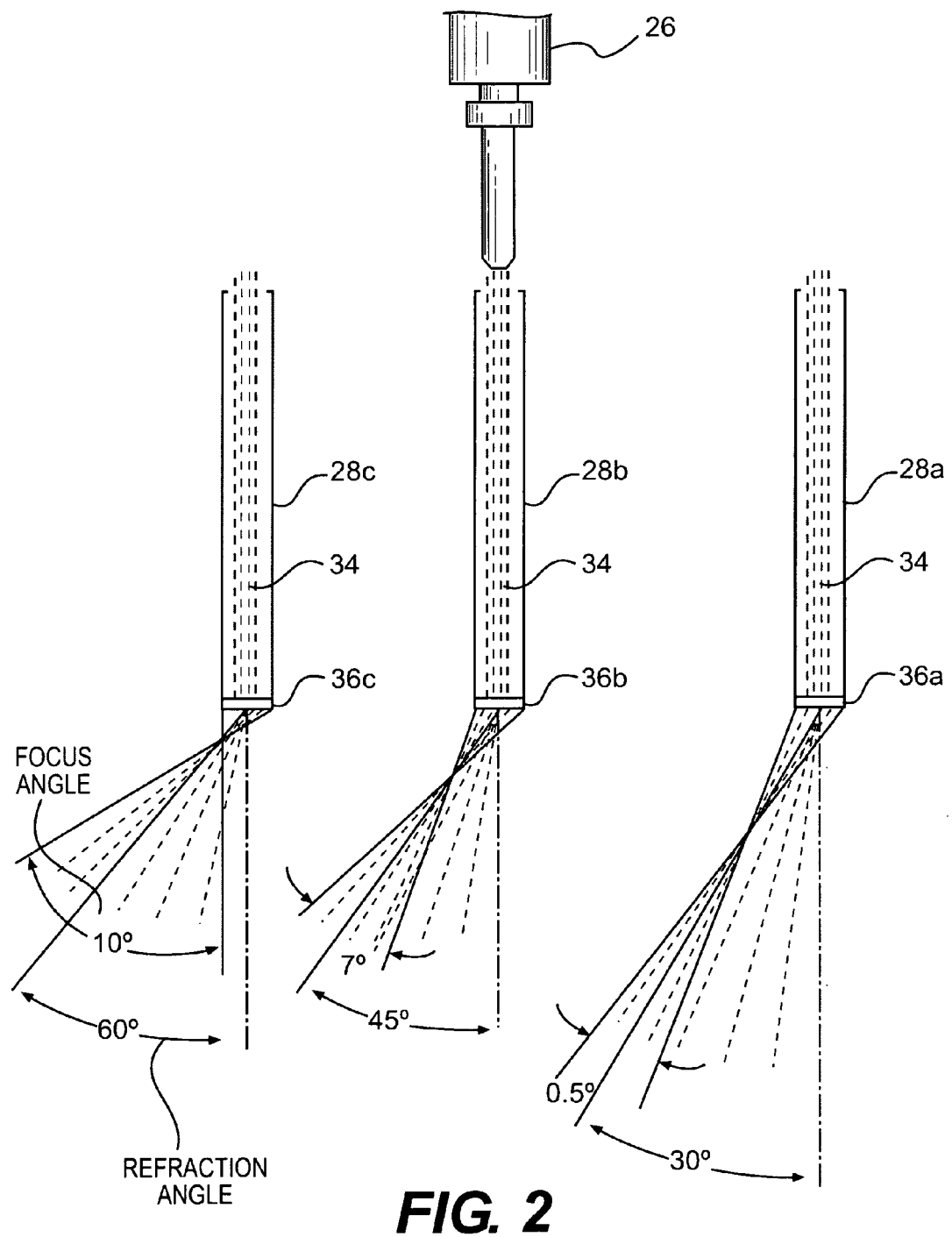
FIG. 2 is a diagrammatic illustration of different exemplary delivery media that may be used in conjunction with the manufacturing system of FIG. 1.
Figure 3:
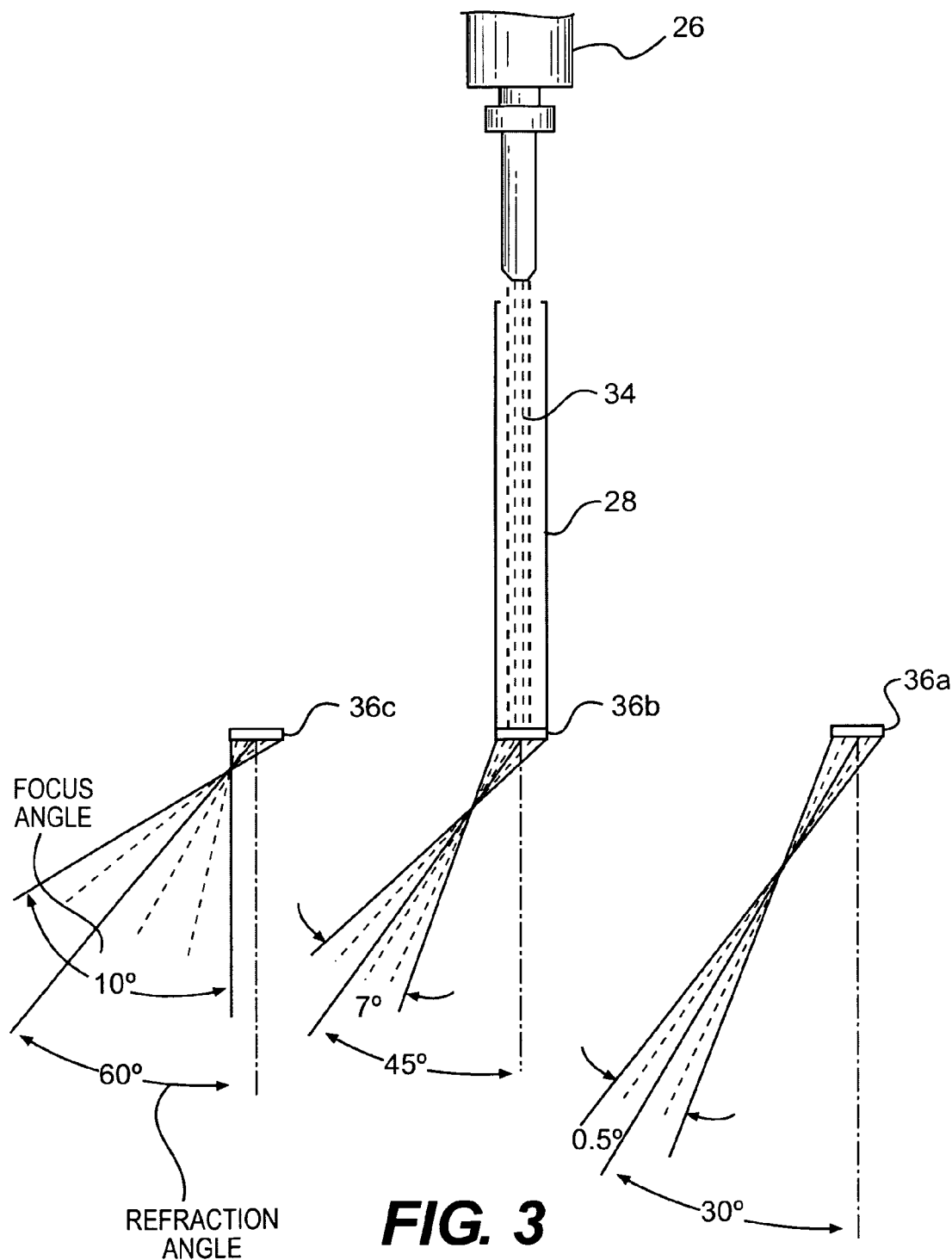
FIG. 3 is a diagrammatic illustration of different exemplary gradient index lenses that may be used in conjunction with the manufacturing system of FIG. 1.

As illustrated in FIG. 2, multiple delivery media 28 having different GRIN lenses coupled thereto may be attachable to a single laser source 26 and interchanged (i.e., coupled/decoupled one at a time) to produce a feature 12 (referring to FIG. 1) having a specific flow characteristic (i.e., to produce a feature 12 having a desired taper angle $\theta_1$, a desired droop angle $\theta_2$, a desired inlet opening diameter, a desired exit opening diameter, a desired cross-sectional shape, etc.). For example, a first delivery media 28a may have a first optics 36a attached thereto and be utilized to produce a feature 12 having a 0.5° taper angle (i.e., laser beam 34 may have a focus angle of about 0.5° when passing through the first GRIN lens), a 30° droop angle (i.e., laser beam 34 may have a refraction angle of about 30° when passing through the first GRIN lens), and/or a particular laser beam entrance/exit diameter (i.e., laser beam 34 may have a particular effective diameter at the entrance and exit openings of feature 12) and shape that increases a flow velocity of fluid exiting feature 12, while a second delivery media 28b may have a second optics 36b attached thereto and be utilized to produce a feature 12 having a 7° taper angle, a 45° droop angle, and/or a different laser beam entrance/exit diameter and shape. Similarly, a third delivery media 28c may have a third optics 36c attached thereto and be utilized to produce a feature 12 having a 10° taper angle, a 60° droop angle, and/or a particular laser beam entrance/exit diameter and shape. Alternatively, as illustrated in FIG. 3, each of optics 36a, 36b, 36c could be removably attached to a single delivery media 28, if desired. In this configuration, one GRIN lens may be interchanged with another GRIN lens and connected to the same delivery media 28 to thereby alter the characteristics of feature 12, if desired.

Control module 30 may control operation of manufacturing system 10 in response to sensory input and/or one or more sets of instructions contained within memory. Control module 30 may include, among other things, a sensor 32, a power supply 38, and a controller 40 in communication with laser source 26, sensor 32, and power supply 38. In response to signals received from sensor 32, controller 40 may adjust power sent to and/or operation of laser source 26. It is contemplated that control module 30 may also communicate with the actuator associated with mount 24 to selectively move workpiece 14 relative to laser source 26 based on input from sensor 32 and/or instructions stored in memory, if desired.

Sensor 32 may be positioned such that as laser beam 34 passes through feature 12 during the creation thereof, a characteristic of laser beam 34, for example a reflected and/or diffracted light pattern, may be received by sensor 32. In one embodiment, sensor 32 may be a light receiver such as a CCD camera or an image array. The light pattern produced by laser beam 34 may be formed on sensor 32 by an interaction of laser beam 34 with sensor 32. Characteristics of the light pattern sensed and/or recorded by sensor 32 can include an angle of refraction, a manner in which light diffuses through sensor 32, an area of illumination, an intensity of illumination, a distribution of light intensity over a surface of sensor 32, etc. Sensor 32 may generate a signal indicative of the received light pattern, and direct this signal to controller 40.

Power supply 38 may be any type of power supply that is capable of providing a variable supply of power, such as a battery, an AC power supply, or a DC power supply such as a linear power supply, a switching power supply, a DC-DC converter, or a silicon controlled rectifier (SCR). Power supply 38 may be directly or indirectly connected to laser source 26 and/or sensor 32 by way of controller 40. Thus, depending on a desired set of conditions, controller 40 may regulate power supply 38 to alter a polarity, a current, a voltage, and/or other parameters of the power directed to laser source 26 in response to signals from sensor 32.

Controller 40 may embody a single microprocessor or multiple microprocessors that include a means for controlling an operation of manufacturing system 10. Numerous commercially available microprocessors may perform the functions of controller 40. Controller 40 may include or be associated with a memory for storing data such as, for example, an operating condition, design limits, performance characteristics or specifications of manufacturing system 10 and features 12, and operational instructions. Various other known circuits may be associated with controller 40, including power supply circuitry, signal-conditioning circuitry, solenoid driver circuitry, communication circuitry, and other appropriate circuitry. Moreover, controller 40 may be capable of communicating with other components of manufacturing system 10 via either wired or wireless transmission and, as such, controller 40 may be disposed in a location remote from manufacturing system 10, if desired.

Controller 40 may adjust operation of manufacturing system 10 to adjust the creation of feature geometry within workpiece 14 in response to signals received from sensor 32. Specifically, controller 40 may record the signals from sensor 32 over a period of time and responsively create a light pattern history indicative of the feature forming process. This history may then be used by controller 40 to create a 3-D image of the feature being formed based on a pattern study algorithm, a statistical solution, a neural network analysis, or other strategy. Controller 40 may then cause power supply 40 to adjust parameters of the power supplied to laser source 26 in response to the 3-D image and/or in response to a comparison of that 3-D image with a desired feature image. Alternatively or additionally, controller 40 may directly adjust operation of laser source 26 (i.e., adjust a number of pulses, a duration of each pulse, an intensity of each pulse, a shape of laser beam 34, etc.) to achieve the desired feature profile. As such, controller 40 may adjust machining of feature 12 based on real-time feedback provided by sensor 32. It is also contemplated that controller 40 may alternatively directly compare the light pattern received by sensor 32 with a desired light pattern, and responsively adjust operation of manufacturing system 10 without creation of a 3-D image, if desired.

Industrial Applicability

The disclosed manufacturing system may be used to produce multiple sizes and shapes of micro-orifices within a fuel injector. In particular, the disclosed system may be used to efficiently manufacture small orifices having reverse taper geometry and a range of taper and droop angles that increase coefficients of discharge and reduce a likelihood of cavitation. Such reverse tapered orifices may provide durable and consistent injector performance, which may be advantageous in the pursuit of sustainable low-level emissions. Operation of manufacturing system 10 will now be described.

To begin the process of creating features 12 within workpiece 14, an operator may load workpiece 14 into mount 24 and position-calibrate workpiece 14 with respect to mount 24. In one example, multiple mounts may be associated with a single laser source 26 and/or a single machining center (not shown). As such, the operator may load and position-calibrate multiple workpieces 14 before proceeding further with the machining process, if desired.

After workpiece 14 is properly loaded and position-calibrated, mount 24 and secured workpiece 14 may be moved into a machining position relative to delivery media 28. It is contemplated that mount 24 may be moved toward delivery media 28, that delivery media 28 may be moved toward mount 24, or that both mount 24 and delivery media 28 may be moved in preparation for machining. In any of these situations, delivery media 28 may be located within bore 16 at a desired depth and rotational angle prior to machining of features 12. At about the same time workpiece 14 is positioned relative to delivery media 28, sensor 32 may also be positioned at a location corresponding to an anticipated exit trajectory of laser beam 34 such that characteristics of laser beam 34 may be monitored by sensor 32 during creation of feature 12. It is contemplated that sensor 32 may alternatively be permanently or removably fixed relative to mount 24 and/or delivery media 28, if desired, such that substantially no positioning of sensor 32 is required prior to machining.

Once workpiece 14 is correctly positioned relative to delivery media 28 (i.e., relative to optics 36), machining of feature 12 may commence according to one or more sets of instructions pre-programmed into the memory of controller 40 and/or according to manual instructions received from the operator at the time of manufacturing. As laser beam 34 is generated by source 26, it may be directed into the hollow portion of workpiece 14 (i.e., into bore 16) by way of delivery media 28. And, as laser beam 34 reaches the tip end of delivery media 28, it may be refracted and focused onto wall 22 of workpiece 14. As laser beam 34 contacts internal surface 22a, laser radiation from beam 34 may be absorbed by internal surface 22a causing a portion thereof to heat up. Once an ablation temperature of the material has been achieved, a hot cloud of vaporized surface material may be removed from wall 22, leaving behind a micro-crater. Continued contact of laser beam 34 with wall 22 may result in additional material being removed from internal surface 22a in a controlled fashion such that feature 12 is formed.

As feature 12 is being created, the resulting micro-crater may eventually be deep enough within wall 22 that laser beam 34 pierces through wall 22 and one or more characteristics of laser beam 34 (e.g., the pattern of light resulting from reflection and/or refraction of laser beam 34 off of internal surfaces of feature 12) are received by sensor 32. Sensor 32 may generate a signal indicative of the received characteristic, and direct the signal to controller 40 for creation of the 3-D feature image and comparison of that image with the desired feature image.

Based on a difference between the created 3-D image and the desired 3-D image, controller 40 may adjust operation of manufacturing system 10. Specifically, controller 40 may adjust a parameter of the power supplied to laser source 26, an operational parameter of laser source 26, and/or a relative position between delivery media 28 and workpiece 14 such that the created 3-D image substantially matches the desired feature image. Controller 40 may make these adjustments during formation of feature 12 (as opposed to after feature 12 has already been created and the machining process is over) to actively control the formation process based on real-time feedback from sensor 34.

Once a first feature 12 has been created within workpiece 14, laser source 26 may be controlled to stop generating laser beam 34, and workpiece 14 may be repositioned (i.e., workpiece 14 may be moved out of position relative to laser source 26 and then moved back into position relative to laser source 26 after adjustments to the configuration of delivery media 28 and/or optics 36 have been made) for the creation of a second feature 12. In one example, six to fourteen similar features 12 may be created within a single workpiece 14. And, these features 12 may or may not be identical. That is, some features 12 may have a different laser entrance opening diameter (i.e., a different diameter at internal surface 22a), a different laser exit opening diameter (i.e., a different diameter at external surface 22b), a different taper angle $\theta_1$, a different droop angle $\theta_2$, a different axial location within bore 16, a different cross-sectional shape, etc. If geometrical differences between features 12 of a single workpiece 14 are desired, it may be necessary to interchange delivery medias 28 and/or the GRIN lenses used to create the features 12 between the creation of the features 12 while workpiece 14 is moved out of the machining position.

After all required features 12 have been created within workpiece 14, a post-processing step may be performed on workpiece 14. The post-processing step may include, among other things, cleaning of workpiece 14 to remove loose debris created during the machining process. Because of the accuracy of manufacturing system 10, this post-processing step may require less time and resources than would normally be associated with non-laser forms of machining.

The disclosed manufacturing system may have many benefits. Specifically, because substantially no movement of laser source 26 or workpiece 14 is required during creation of feature 12, manufacturing system 10 may be simple, having few components, and the resulting quality of machining may be high. Further, because feature 12 may be created from within bore 16, the likelihood of unintended secondary damage to workpiece 14 after penetration of laser beam 34 may be low. In addition, the ability to produce features having variable geometry with the same manufacturing system may result in reduced production costs and increased applicability.

It will be apparent to those skilled in the art that various modifications and variations can be made to the disclosed manufacturing system. Other embodiments will be apparent to those skilled in the art from consideration of the specification and practice of the disclosed manufacturing system. For example, although shown for use in producing a fuel injector nozzle, it is contemplated that manufacturing system 10 may alternatively or additionally be used to produce feature 12 within other components such as a turbine blade, if desired. It is intended that the specification and examples be considered as exemplary only, with a true scope being indicated by the following claims and their equivalents.

What is claimed is:

1. A method of manufacturing an injection orifice in a fuel injector nozzle, the method comprising:
   loading the fuel injector nozzle into a mount;
   locating a reflective passageway within a bore of the fuel injector nozzle;
   generating a laser beam;
   directing the laser beam through the reflective passageway that is located in the fuel injector nozzle; and
   refracting and focusing the laser beam as the laser beam exits the reflective passageway through a gradient index lens onto an internal surface of the fuel injector nozzle to form the injection orifice.

2. The method of claim 1, wherein the injection orifice is a first injection orifice, and the method further includes adjusting at least one of the refracting and the focusing to form a second infection orifice having a geometry substantially different from a geometry of the first injection orifice.

3. The method of claim 2, wherein the second injection orifice is formed to have at least one of a taper angle and a droop angle substantially different from that of the first injection orifice.

4. The method of claim 2, wherein adjusting the refracting includes adjusting a refraction angle of the laser beam within a range of about 10-60°.

5. The method of claim 2, wherein adjusting the focusing includes adjusting a focus angle of the laser beam within a range of about 0.1-10°.

6. The method of claim 5, wherein adjusting the focusing includes changing the refraction angle of the laser beam from one of about 30°, about 45°, and about 60° to another of about 30°, about 45°, and about 60°.

7. The method of claim 2, further including:
   moving the fuel injector nozzle out of a position in which the first injection orifice is formed, wherein the adjusting at least one of the refracting and the focusing occurs after formation of the first injection orifice and before formation of the second injection orifice; and
   moving the fuel injector nozzle back into the position before formation of the second injection orifice.

8. A method of manufacturing a fuel injector nozzle, the method comprising:
   loading the fuel iniector nozzle into a mount;
   generating a laser beam;
   directing the laser beam through a first light-reflecting delivery media that is located within a bore of the fuel injector nozzle, the laser beam being directed from a base end of the fuel injector nozzle to a tip end of the fuel injector nozzle;
   re-directing the laser beam from the first light-reflecting delivery media through a first gradient index lens located at a tip end thereof against an internal surface of the fuel injector nozzle to form a first injection orifice;
   exchanging the first light-reflecting delivery media for a second light-reflecting delivery media;
   directing the laser beam through the second light-reflecting delivery media that is located within the bore of the fuel injector nozzle, the laser beam being directed from the base end of the fuel injector nozzle to the tip end of the fuel injector nozzle; and
   re-directing the laser beam from the second light-reflecting delivery media through a second gradient index lens located at the tip end thereof against the internal surface of the fuel injector nozzle to form a second injection orifice having a geometry different from a geometry of the first injection orifice.

9. The method of claim 1, further including:
   positioning a sensor at a location at which the laser beam is anticipated to exit through the fuel injector nozzle after formation of the injection orifice.

10. The method of claim 9, further including:
    receiving one or more characteristics of the laser beam with the sensor;
    generating a signal indicative of the received one or more characteristics;
    creating an image of the first injection orifice based on the generated signal; and
    comparing the created image with a desired image to determine whether the first injection orifice is completely formed.

11. The method of claim 1, wherein locating the reflective passageway includes removably connecting the reflective passageway to a laser source that generates the laser beam.

12. The method of claim 1, wherein generating the laser beam includes generating the laser beam with ultra-short pulse laser source.

13. The method of claim 1, wherein locating the reflective passageway includes locating the reflective passageway that is a hollow core fiber.

14. The method of claim 1, wherein locating the reflective passageway includes locating the reflective passageway that is a glass optical fiber.

15. A method of manufacturing an injection orifice in a fuel injector nozzle, the method comprising:
    loading the fuel injector nozzle into a mount;
    locating a reflective passageway within a bore of the fuel injector nozzle;
    directing a laser beam through the reflective passageway that is located in the fuel injector nozzle;
    refracting and focusing the laser beam as the laser beam exits the reflective passageway through a gradient index lens onto an internal surface of the fuel injector nozzle to form the injection orifice;
    positioning a sensor at a location at which the laser beam is anticipated to exit through the fuel injector nozzle after formation of the injection orifice;

receiving one or more characteristics of the laser beam with a sensor that is positioned at a location at which the laser beam is anticipated to exit through the fuel injector nozzle after formation of the injection orifice;

generating a signal indicative of the received one or more characteristics;

creating an image of the first injection orifice based on the generated signal; and comparing the created image with a desired image to determine whether the first injection orifice is completely formed.

16. The method of claim 15, wherein locating the reflective passageway includes removably connecting the reflective passageway to a laser source that generates the laser beam.

17. The method of claim 15, wherein generating the laser beam includes generating the laser beam with ultra-short pulse laser source.

18. The method of claim 15, wherein locating the reflective passageway includes locating the reflective passageway that is a hollow core fiber.

19. The method of claim 15, wherein locating the reflective passageway includes locating the reflective passageway that is a glass optical fiber.

* * * * *